Patented June 23, 1953

2,643,228

UNITED STATES PATENT OFFICE 2,643,228

GEL MODIFIER FOR OILS AND METHOD OF PREPARING IT

Donald C. Bond, Northbrook, and Michael Savoy, Chicago, Ill., assignors to The Pure Oil Company, Chicago, Ill., a corporation of Ohio No Drawing. Application October 2, 1948, Serial No. 52,592

3 Claims. (Cl. 252—37)

The instant invention relates to a method of lowering the gel strength of a crude oil and, in particular, embodies a method and composition for lowering the gel strength of a crude oil, such as one in the process of being withdrawn from a well so that the formation of gelatinous paraffinic deposits in the well and tubing can be readily prevented.

Various pour point depressants or gel modifiers are known in the art and are used in situations where an oil must be conveyed by pipe line through cold zones and is thereby exposed to conditions which raise its viscosity and reduce its mobility. Because serious complications in the handling of oil arise when the viscosity is raised or the temperature lowered to the point where paraffinic deposits form in conduits, it is highly desirable that some convenient means for reducing the gel strength of the oil be developed. That is to say, the gel strength of the oil is an index of its mobility.

In the art, various compositions are known for the purpose of reducing the gel strength of oil and are effective to various degrees. Some of those available are the proprietary products appearing commercially under the trade-marks "Paraflow" and "Santopour." Aluminum fatty acid salts, such as stearates and basic aluminum stearates, are also known pour depressants and have been used in oils as described in United States Patents 1,896,342, of February 7, 1933, and 1,942,636, of January 9, 1944, to Bennett and Story.

One of the principal difficulties involved in the use of various pour point depressants or gel modifiers, in particular, the aluminum salts, resides in their low solubility in the hydrocarbon to which they are to be added. Because the lowering of the gel strength of an oil involves the inhibition of crystal formation, relatively small amounts of the materials are effective so that the aluminum salts, in spite of their low solubility, are useful. However, siutations arise where the desired degree of pour point lowering cannot be obtained because it is limited by the solubility of the aluminum compound in the oil.

It is a fundamental object of the instant invention to derive a composition useful for lowering the gel strength of oils, which composition has the advantage of being very soluble in hydrocarbons and in the crude oils in which it is to be used.

It is a second object of the invention to devise a method of preparing a composition having a high solubility in hydrocarbon materials, which composition is extremely useful as a gel modifier in that it is at least comparable in effectiveness with the depressants commercially in use.

It is a further object of the invention to provide a method of preventing paraffin gel formation in pipes and tubes carrying oils.

Other objects and advantages of the invention will in part be obvious and in part appear hereinafter.

The invention, accordingly, comprises a method for inhibiting paraffin wax or gel formations in oil wells and lines carrying paraffin-containing oils, which involves dissolving in the oil being carried a useful amount of a condensation product of a fatty acid-aluminum salt and an amine. The invention in its second aspect includes novel compositions of matter which are the condensation products of aluminum salts of fatty acids having 12 or more carbon atoms in the molecules and primary, secondary or tertiary straight and branched-chain alkyl and alkanolamines in which the alkyl or alkanol groups of the molecules contain at least about 2 carbon atoms each.

In accordance with the invention, it has been found that a very small quantity of a condensation product of an amine of the class identified and a fatty acid aluminum salt, such as aluminum stearate or hydroxy aluminum stearate, in the mono or di form lowers the gel strength of crude oils containing paraffin to a substantial degree. It is understood that the gel strength of a crude oil depends to some extent on the temperature and past history thereof, but it has been found that a crude having a gel strength of 25 to 40 grams measured by the Stormer Method will have it reduced practically to a level as low as about 3 to 5 grams when it is treated in accordance with our invention by the addition of as little as 0.005 per cent by weight of the aluminum salt and amine condensation product up to 5 per cent thereof, with the preferred amount being about 0.1 to 0.25 per cent.

This reduction in the gel strength of waxy oils at the same time reduces their effective viscosities to a substantial extent. Such reduction of viscosity is advantageous largely in that the amount of power needed to pump an oil is lowered and it may become possible to transport oils under conditions which might otherwise prohibit their being pumped.

For the preparation of the condensation product, the aluminum salt and amine are warmed together in a flask to bring about the necessary reaction. Depending upon the temperature used for the condensation, the reaction time may be as much as about six hours. The product will vary in nature in accordance with the aluminum salt used and the particular amine reacted therewith. There are three fatty acid salts of aluminum, namely, the tri-fatty acid salt, the di- and the mono-salts, with which there can be reacted, for example, the mono-, di- or tri-alkanolamine of an alcohol such as ethanol, isopropanol, butanol, pentanol or hexanol, etc. Though amines having larger alkanol or alkyl groups are useful in producing derivatives of the fatty acid aluminum salts which are effective paraffin crystallization inhibiting materials, there is no great advantage to be gained in employing them when the amines carrying relatively short chains or small groups are effective. It appears that rather than the number of carbon atoms in the condensation product or the molecular weight thereof, it is the branching of the fatty acid chain obtained by the addition thereto of amine residue which determines the effectiveness of the condensation product as a pour point depressant and gel inhibitor.

Because any trivalent metal can form three different salts, the nomenclature of the compounds can become confused, particularly if the acid is a substituted one. The convention adopted in the nomenclature of the metal salts used in this case is as follows: the indication of the number of acid groups reacted with the metal is obtained from the prefix in parenthesis following the identification of the metal. Thus, aluminum (di) hydroxystearate has the empirical formula:

$$Al(OH)[OOC(CH_2)_{10}CHOH(CH_2)_5CH_3]_2$$

for it is the di-salt of hydroxystearic acid. Similarly, aluminum (tri) stearate has the empirical formula:

$$Al[OOC(CH_2)_{16}CH_3]_3$$

To establish the effectiveness of the condensation products described as gel modifiers, a series of experiments was conducted in which various condensation products of aluminum salts prepared by reaction of given amines therewith in specified ratios and at specified temperatures were tested by adding a small proportion thereof to samples of crude oil. The Stormer gel strength of the crude at 39° F. was determined after the mixture of the crude and the gel modifier was preheated in a bomb at 120° F. for 40 minutes. To obtain full effectiveness of the gel inhibitor, it is best to blend it completely with the oil. As indicated, this is done by heating the oil and inhibitor together for a period long enough to insure thorough blending. In general, a period during which the oil and inhibitor are held at a tempearture of about 100° to 150° F. for about 15 minutes to an hour will be adequate. When the process of gel inhibition is being applied directly to oil being taken from a well, temperatures in the bottom of the well will usually be in the desired range. If the hole temperature is not sufficiently high to insure adequate blending, auxiliary heating means can be supplied, usually by injecting hot oil containing the inhibitor, steam, or other heating means.

Results of some tests of the gel inhibitor are tabulated in the following table:

TABLE I

*Effect of the condensation products of aluminum fatty acid salts and amines on gel strength of crude oil at 39° F.*

| Test No. | Condensation Product | | Ratio, II/I | Cond. Temp.[1] | Effect of Cond. Prod. on Gel Strength of Crude Oil | |
| --- | --- | --- | --- | --- | --- | --- |
| | Aluminum Salt—I | Alkylolamine—II | | | Gm. Cond. Prod. per 100 gm. Crude | Gel Strength of Crude @ 39° F.[2] |
| 1 | Aluminum (di) Hydroxy Stearate | Triethanol Amine | 1. | 400 | 0.15 | 3 |
| 2 | ----do---- | ----do---- | 0.5 | 400 | 0.15 | 3 |
| 3 | ----do---- | ----do---- | 2. | 400 | 0.15 | 7 |
| 4 | ----do---- | ----do---- | 3. | 320 | 0.15 | 5 |
| 5 | ----do---- | ----do---- | 1. | 480 | 0.15 | 4 |
| 6 | ----do---- | ----do---- | 2. | 490 | 0.15 | 5 |
| 7 | Aluminum (tri) Stearate | ----do---- | 2. | 480 | 0.15 | 5 |
| 8 | Aluminum (di) Hydroxy Stearate | Diethanol Amine | 1. | 320 | 0.15 | 14 |
| 9 | None | Triethanol Amine | | | 0.15 | 45 |
| 10 | ----do---- | None | | | 0.00 | 43 |

[1] Condensation temperature—Temperature at which aluminum salt and alkanolamine were heated, °F.
[2] All mixtures pre-heated in bomb at 120° F. for 40 minutes before gel strength determined.

The data given in the table summarize tests made with condensation products prepared from a few fatty acid salts of aluminum and amines. It appears quite clearly from tests 1 through 8 as compared with tests 9 and 10 shown in Table I that the gel strength of a typical crude oil is materially reduced when a small proportion of the condensation product of the alkanolamine and aluminum fatty acid salt is incorporated therein. We have found that there is little difference between the several aluminum salts and the particular ethanolamine used as long as the condensation product of the alkanolamine and the aluminum salt represents a composition formed from about one mole of the amine for each mole of the aluminum salt.

TABLE I-A

*Gel strength of crude oil containing condensation products*

| No. | Condensation Product | | | Stormer Gel Strength Determination | |
|---|---|---|---|---|---|
| | I—Salt | II—Amine | Mol, II/I at T, °F. | Percent Cond. Prod. by wt. | Stormer Gel Strength, Gm. at T, °F. |
| 1 | | None | | 0.0 | 48 at 39° |
| 2 | | do | | 0.0 | 40 at −13° |
| 3 | Lithium Stearate | Triethanolamine | 2.0 at 500° | 0.15 | 35 at 39° |
| 4 | | Same as #3 | | 0.15 | 25 at −13° |
| 5 | Aluminum (di) Hydroxy Stearate | Tetraethylene Pentamine | 2.0 at 480° | 0.15 | 25 at 39° |
| 6 | | Same as #5 | | 0.15 | 40 at −13° |
| 7 | Titanium (tetra) Stearate | Triethanolamine | 3.0 at 500° | 0.15 | 28 at 39° |
| 8 | | Same as #7 | | 0.15 | 29 at −13° |
| 9 | Barium (di) Stearate | Triethanolamine | 2.0 at 500° | 0.15 | 28 at 39° |
| 10 | | Same as #9 | | 0.15 | 38 at −13° |
| 11 | Aluminum (di) Hydroxy Stearate | Monoethanolamine | 3.0 at 480° | 0.15 | 7 at −13° |
| 12 | do | Hexadecyl Amine | 3.0 at 480° | 0.15 | 30 at −13° |
| 13 | do | Triethanolamine | 2.0 at 490° | 0.15 | 4 at −13° |
| 14 | | Same as #13 | | 0.15 | 5 at 39° |
| 15 | Aluminum (tri) Stearate | Triethanolamine | 2.0 at 490° | 0.15 | 5 at −13° |
| 16 | do | | | 0.15 | 3 at 39° |
| 17 | Aluminum (tri) Hydroxy Stearate | | | 0.15 | 2 at 39° |

Table I-A is a tabulation of data taken from an extension of the experimental work summarized in Table I showing the results of certain tests made with aluminum salts and others and some amines in addition to ethanolamines. For example, tests 3 and 4 in Table I-A are included as typical of those indicating that the alkali metal fatty acid salts do not form condensation products having a useful degree of effectiveness. Tests 5 and 6 in which the amine used was tetraethylene pentamine illustrate that the condensation product thereof with aluminum (di) hydroxy stearate is relatively ineffective. Tests 7 and 8 show that titanium (tetra) stearate condensed with triethanolamine is only moderately effective in reducing the gel strength of the oil. Similar effects are shown for barium (di) stearate and triethanolamine in tests 9 and 10.

The condensation products of the aluminum salts and amines suitable for use in crude oils as gel modifiers are prepared by reaction between the amine and the aluminum salt. Because the aluminum fatty acid salt may be a tri-salt, a di or mono compound, and because the amine may be primary, secondary or tertiary, a wide variety of compositions coming within the scope of the invention can be prepared. However, because it appears that the pour point lowering or gel inhibiting action of the condensation product is dependent upon the branching created in the aluminum fatty acid salt molecule, the more effective inhibitors are prepared from aluminum di- and tri-salts and the secondary and tertiary amines. As a typical example of the preparation, the following is given:

Aluminum tri-stearate was suspended in diethanolamine in an amount such that the molar ratio of the diethanolamine to aluminum tri-stearate was 2:1. The mixture was heated to 480° F., and maintained at that temperature for six hours under reflux. Upon completion of the reaction, a solid having the consistency of soft soap was obtained which was a condensation product of the aluminum stearate and the diethanolamine.

In similar manner, other condensation products of aluminum salts and amines can be prepared. For example, aluminum (di) hydroxy stearate and triethanolamine can be condensed to give a soft solid by heating them together in the molar ratio of 1:1 and at a temperature of about 400° F.

Further examples of aluminum salts which are useful as starting materials for the preparation of condensation products with amines are found in the class of compounds consisting of aluminum salts of fatty acids having at least about 12 carbon atoms or more. Thus, aluminum mono-, di- or tri-salts of fatty acids, such as lauric, stearic, oleic, linoleic, palmitoleic, ricinoleic, erucic, cerotic acids, are useful. Useful amines include mono-, di- and trialkanolamines having alkyl or alkanol groups of any chain length, such as amines having alkyl or alkanol groups carrying as many as 20 or 30 carbon atoms. However, it is easier to employ the commoner amines having shorter alkyl and alkanol groups. For example, ethanol, propanol, isopropanol, butanol amines and the corresponding alkylamines form perhaps the most useful ones inasmuch as the compounds are more easily prepared than those of higher molecular weight.

The alkanolamines are convenient to use because they contain an amine residue carrying a functional group which is available for reaction and condensation with the aluminum salt. Other substituted amines, particularly the halogen substituted alkylamines, are also useful in the preparation of condensation products, for the halogen group provides the means of attachment or condensation with the aluminum salt. Thus, haloalkylamines, such as chloro, bromo, iodo, ethyl, propyl and butyl amine and the like can be used.

Although the aluminum fatty acid salts as typified by the stearates are good pour point depressants and materials for lowering the gel strength of crude oils, their use is hindered by their very low solubility in crude oils. Tests indicate that the aluminum salts are not adequately soluble in such materials as lard oil, methyl cellusolve, castor oil, oleic acid, butanol, amyl acetate, cotton seed oil and peanut oil. It was found that in the condensation of the aluminum fatty acid salts with the alkanolamines as described above, however, a complex was formed which was soluble in hydrocarbons to a substantial extent and was very effective in lowering the gel strength of the crude oils. Thus, for the injection of the condensation product into a crude to reduce the pour point or gel strength thereof, all that is necessary is to dissolve the composition in a light hydrocarbon and combine the solution with the crude.

Tests comparable with those summarized in Table I were made on the same crude using various known pour point depressants in the amount of 0.15 per cent by weight.

TABLE II

*Gel strength of a crude oil at 39° F. containing additives (Mixture preheated to 120° F., 40 min.)*

| Test No. | Additive (0.15% by weight) | Stormer, Gel Stfength, gm. |
|---|---|---|
| 1 | Triethyl Borate | 30 |
| 2 | Hexachlorodiphenyl-oxide | 15 |
| 3 | Diglycol Laurate | 35 |
| 4 | Lead Naphthenate | 35 |

From the results thus reported, it should be apparent that a composition has been devised which has the double advantage of being superior to known pour depressants in its effectiveness in lowering the pour point or gel strength of oil and also in that it has a high solubility in the oil. Although only a restricted number of examples have been given, substantially any of the class of condensation products of aluminum salts with organic amines which has been outlined are quite effective in reducing the pour point of a given crude. The amount to be used, of course, should preferably be kept quite low because of the economics of a given situation and for that reason, any material which is effective in very low concentrations is to be desired. The instant compositions are quite effective in reducing the pour point of oil a significant amount when present in amounts from 0.005 to as much as 5.0 per cent by weight. It is, of course, preferred that the range of concentrations used be about 0.10 to about 0.25 per cent of the oil by weight because the addition of greater amounts merely includes in the oil a foreign ingredient which is removed at some later stage in the process. In the various examples given in the specification, the amount of gel modifier used was 0.15 per cent because this figure represents a practicable one in that the effect produced is useful and the amount of material needed is moderate.

Though the number of examples of the invention given in the specification is limited, the nature and scope thereof is clear and, accordingly, the examples are to be considered illustrative of the invention and not as limitations thereof.

What is claimed is:

1. The process of transferring wax-containing crude petroleum oils which flow with difficulty at subatmospheric temperatures which comprises introducing into said crude oil the condensation product of a fatty acid salt of aluminum containing at least about 12 carbon atoms per molecule and an alkylol amine containing at least about 2 carbon atoms in each of the alkylol substituents of the molecule, said condensation product being that resulting from the reaction of the aluminum salt and the amine in the molecular ratio of about 0.25 to 4.0 moles of amine per mole of aluminum salt at a temperature between about 300° and 500° C., said condensation product being present in an amount sufficient to improve the viscosity and flow characteristics of said oil at subatmospheric temperatures and pumping the resulting admixture within a conduit.

2. The process of transferring wax-containing crude petroleum oils which flow with difficulty at subatmospheric temperatures which comprises introducing into said oil from about 0.005 to 5% by weight of a condensation product of a fatty acid salt of aluminum containing at least about 12 carbon atoms per molecule and an alkylol amine containing at least about 2 carbon atoms in each of the alkylol substituents of the molecule, said condensation product being that resulting from the reaction of the aluminum salt and the amine in the molecular ratio of about 0.25 to 4.0 moles of amine per mole of aluminum salt at a temperature between about 300° and 500° C. and pumping the resulting admixture within a conduit.

3. A method in accordance with claim 2 in which said condensation product is prepared from aluminum stearate and triethanolamine.

DONALD C. BOND.
MICHAEL SAVOY.

References Cited in the file of this patent

UNITED STATES PATENTS

| Number | Name | Date |
|---|---|---|
| 1,896,342 | Bennett | Feb. 7, 1933 |
| 1,942,636 | Bennett | Jan. 9, 1934 |
| 2,253,399 | Schott | Aug. 19, 1941 |
| 2,253,585 | Schott | Aug. 26, 1941 |
| 2,364,222 | Kaufman | Dec. 5, 1944 |